United States Patent [19]

Borys et al.

[11] Patent Number: 5,182,141
[45] Date of Patent: Jan. 26, 1993

[54] BILAMINATE POLYMER COATED METAL STRIP AND METHOD FOR MANUFACTURE THEREOF

[75] Inventors: Tadeusz Borys, Markham; Shueh-Mo Lee, Downsview; Earlby E. J. Wakefield, Guelph, all of Canada

[73] Assignee: Co-Ex-Tec Industries, Concord, Canada

[21] Appl. No.: 479,469

[22] Filed: Feb. 13, 1990

[51] Int. Cl.$^5$ .............................................. B05D 3/02
[52] U.S. Cl. .................... 427/379; 156/244.1; 156/273.5; 156/315; 427/388.2; 427/409
[58] Field of Search ............... 428/31, 344, 347, 349, 428/635, 354, 424.6; 156/244.1, 182, 281, 304.1, 273.3, 273.5, 315; 427/208.2, 407.1, 200, 372.2, 409, 379, 388.2

[56] References Cited

U.S. PATENT DOCUMENTS

| | | | |
|---|---|---|---|
| 3,788,008 | 1/1974 | Yackiw et al. | 49/496 |
| 3,825,459 | 7/1974 | Taylor | 156/257 |
| 4,052,497 | 10/1977 | Monnet | 264/255 |
| 4,130,535 | 12/1978 | Coran et al. | 260/33.6 |
| 4,220,681 | 9/1980 | Narita | 428/31 |
| 4,268,552 | 5/1981 | Duvdevani et al. | 428/31 |
| 4,291,076 | 9/1981 | Katoh | 428/31 |
| 4,308,302 | 12/1981 | Etter et al. | 428/83 |
| 4,328,273 | 5/1984 | Yackiw | 428/122 |
| 4,358,482 | 11/1982 | Jubelt | 427/259 |
| 4,371,583 | 2/1983 | Nelson | 428/358 |
| 4,381,273 | 4/1983 | Azzola | 264/45.9 |
| 4,411,938 | 10/1983 | Madonia et al. | 428/31 |
| 4,411,941 | 10/1983 | Azzola | 428/122 |
| 4,419,844 | 12/1983 | Kreisfeld | 49/475 |
| 4,434,598 | 3/1984 | Adell | 52/176 |
| 4,438,162 | 3/1984 | Nelson | 427/318 |
| 4,472,469 | 9/1984 | Thies | 428/122 |
| 4,478,897 | 10/1984 | Akashi et al. | 428/31 |
| 4,495,234 | 1/1985 | Tominaga et al. | 428/122 |
| 4,513,044 | 4/1985 | Shigeki et al. | 428/122 |
| 4,541,980 | 9/1985 | Kiersarsky et al. | 264/174 |
| 4,576,773 | 3/1986 | Azzola et al. | 264/167 |
| 4,603,899 | 8/1986 | Iwasa | 296/154 |
| 4,617,220 | 10/1986 | Ginster | 428/122 |
| 4,619,077 | 10/1986 | Azzola | 49/497 |
| 4,634,735 | 1/1987 | Thiersault et al. | 525/88 |
| 4,654,238 | 3/1987 | Yamazaki et al. | 428/31 |
| 4,654,257 | 3/1987 | Murachi | 428/317.1 |
| 4,654,262 | 3/1987 | Alonso | 428/345 |
| 4,668,565 | 5/1987 | Murachi | 428/261 |
| 4,676,856 | 6/1987 | Shigeki et al. | 156/201 |
| 4,701,376 | 10/1987 | Hermann et al. | 428/358 |
| 4,708,351 | 11/1987 | Midooka et al. | 277/184 |
| 4,765,936 | 8/1988 | Ballocca | 264/46.1 |
| 4,767,658 | 8/1988 | Lorenz | 428/192 |
| 4,778,550 | 10/1988 | Barton et al. | 156/211 |
| 4,780,345 | 10/1988 | Gray | 428/35 |
| 4,783,931 | 11/1988 | Kirkwood | 49/91 |
| 4,804,584 | 2/1989 | Nakashima et al. | 428/424.2 |
| 4,810,321 | 3/1989 | Wank et al. | 156/244.23 |
| 4,810,540 | 3/1989 | Ellison et al. | 428/31 |
| 4,975,306 | 12/1990 | Jackson | 428/31 |
| 5,002,809 | 3/1991 | Nakahama | 427/407.1 |

FOREIGN PATENT DOCUMENTS 0046002 2/1982 European Pat. Off.

OTHER PUBLICATIONS

Polyisocyanates in Bonding (T. J. Meyrick and J. T. Watts pp. 150-166. Date: 1949).

*Primary Examiner*—Paul J. Thibodeau
*Assistant Examiner*—Hoa T. Lê
*Attorney, Agent, or Firm*—Blake, Cassels & Graydon

[57] ABSTRACT

A metal substrate having a first thermosetting elastomer layer and a second thermoplastic layer, both layers being chemically bonded to the substrate, and a method of manufacture therefor. Preferably, the first layer is extruded EPDM which is bonded to the substrate by with a heat-activable polyisocyanate adhesive and the second layer is extruded PVC which is bonded to the substrate by a heat-activable modified acrylic adhesive. Flock may be chemically bonded to a portion of the EPDM. An automotive trim product is disclosed. The preferred method of manufacture is a continuous process involving the steps of applying EPDM adhesive to the substrate; heat activating the adhesive; extruding the EPDM onto the substrate; applying PVC adhesive to the substrate; heating the partially coated substrate to concomitantly activate the PVC adhesive and cure the EPDM; and then extruding the PVC onto the substrate.

16 Claims, 4 Drawing Sheets

BILAMINATE POLYMER COATED METAL STRIP AND METHOD FOR MANUFACTURE THEREOF

FIELD OF THE INVENTION

This invention relates to a metal substrate having a first thermosetting elastomer chemically bonded to one region and a second thermoplastic organic polymer chemically bonded to another region of the substrate and to processes for the manufacture thereof. In particular, this invention relates to a metal substrate having a terpolymer of ethylene propylene diene monomer (EPDM) coating bonded to one area of the metal substrate and a polyvinyl chloride (PVC coating bonded to another area of the metal substrate.

BACKGROUND OF THE INVENTION

Polymer coated metals are well known. Their desirability stems largely from the combination of the advantages of a core metal substrate with those of an outer organic polymer coating. In the automobile industry, for example, the characteristics of a metal, such as aluminum, of resilience and conformability are often desirable for trim Pieces. Polymer coatings, while permitting the member to retain these desirable characteristics may augment resistance to the elements, including extreme temperature fluctuations, act as a sealant interface between the glass and an adjacent member such as a supporting frame, Provide a buffer between the metal and the glass of the windshield and Provide exposed Portions which are visually appealing.

The terpolymer of ethylene propylene diene monomer (EPDM), a thermosetting polymer, provides advantageous weathering and sealant characteristics. Polyvinyl chloride (PVC), a thermoplastic polymer, provides a smoother finish than EPDM, is available in a wider range of colors and tends to be more colorfast than EPDM.

An approach taken, in the automobile industry, to obtain a member with the characteristics of these materials has been to manufacture two metal strips, one partially coated with EPDM and the other partially coated with PVC. The strips are then assembled with the EPDM coating a portion of the assembly so as to act as a visually unexposed sealant and the PVC coating a Portion so as to be partly visually exposed on the assembled automobile.

A second approach has been to manufacture a member having a single strip of metal coated with a single Polymer such as EPDM, such a member lacking the advantage of a Portion coated with a second Polymer, such as PVC.

A third approach has been to extrude one of the polymers of EPDM or PVC onto suitably treated metal and then to attach the other of EPDM or PVC to the first extruded Polymer using an appropriate adhesive, such as an alkylcyanoacrylate compound or a hot melt adhesive, or mechanical attachment.

Generally speaking, the process of providing a metal strip with a PVC coating begins with rollforming the metal to the desired shape. The metal is then cleaned and dried. The cleaned metal is then coated with a heat activable adhesive. The coated metal is then heated to evaporate solvents from the adhesive and to activate the adhesive. The PVC is then extruded onto the metal, the activated adhesive serving to chemically bond the Polymer to the metal. Adhesives which require activation by heat, or exposure to utraviolet radiation, for example, are herein referred to as activable adhesives.

Generally speaking, the process of providing a metal strip with an EPDM coating begins with rollforming the metal to the desired shape. The metal is then cleaned, dried and coated with Primer. Solvents of the primer are evaporated and the coated metal is baked to fasten the primer thereto. A heat-activable adhesive is applied in similar fashion to the primer. The adhesive is activated by heat prior to extrusion of EPDM onto the metal. After extrusion, the EPDM on the metal is suitably cured. A one-coat adhesive system may be used instead of the two-coat system described above and has been used successfully in the past by Co-Ex-Tec Industries of Concord, Ontario, Canada.

BRIEF SUMMARY OF THE INVENTION

This invention provides a single metal substrate having a first area with a first thermosetting elastomer chemically bonded thereto and a second area with a second thermoplastic organic polymer chemically bonded to the metal substrate.

In one aspect, this invention Provides a metal substrate having an elastomeric polymer coating, EPDM, bonded to one area of the substrate and a thermoplastic polymer coating, PVC, bonded to another area of the substrate.

In a preferred aspect, this invention provides a product comprising a single metal core substrate having a thermoplastic coating on one area and an elastomeric coating on a second area the Product being suitable for use as exterior automotive trim.

In a further Preferred aspect the two coatings are mutually bonded at their juncture.

Preferably, rubber, or elastomeric, coatings of this invention are of EPDM and thermoplastic coatings are of PVC. EPDM is a thermosetting polymer, application of heat causing the applied polymer to cure or harden. PVC is a thermoplastic, application of heat causing it to soften or melt. Polymers for use in the Process of this invention are applied in molten form to the metal substrate.

In the context of this invention "coating" of a metal substrate, or a "coated" metal substrate, include coating of a portion of a metal substrate or a metal substrate which is only partly coated.

DETAILED DESCRIPTION OF A PREFERRED EMBODIMENT

Figure 1:
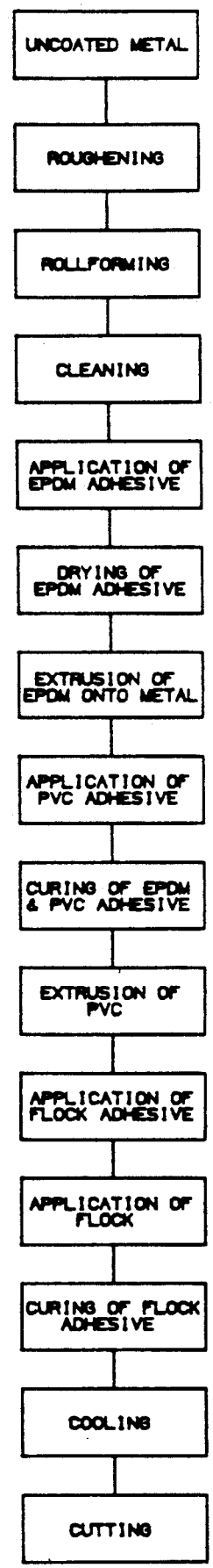
FIG. 1 is a flow diagram which generally outlines steps of a preferred method of production of a bilaminate coated strip.

FIG. 1 is a general outline of the production of an aluminum strip coated with EPDM in a first region, PVC in a second region to produce a preferred embodiment product according to this invention. Details of the method are further described below.

In a Preferred process according to this invention, an aluminum substrate is cleaned, in preparation for application of the adhesive to be used to bond an EPDM layer thereto as follows. After rollforming, the formed aluminum strip is Passed through an enclosed cleaning tank where it is sprayed with warm alkaline solution. Typically, the solution has a PH of about 10 to 12 and a temperature of about 60° C., the conditions being sufficient to condition the metal for adhesion of later applied adhesives and coatings. The strip is next passed through a second rinse tank wherein it is sprayed with water in order to remove the alkaline cleaning solution. The metal is then dried with a hot air blast at about 90° C. to 100° C.

EXAMPLE

Figure 2:
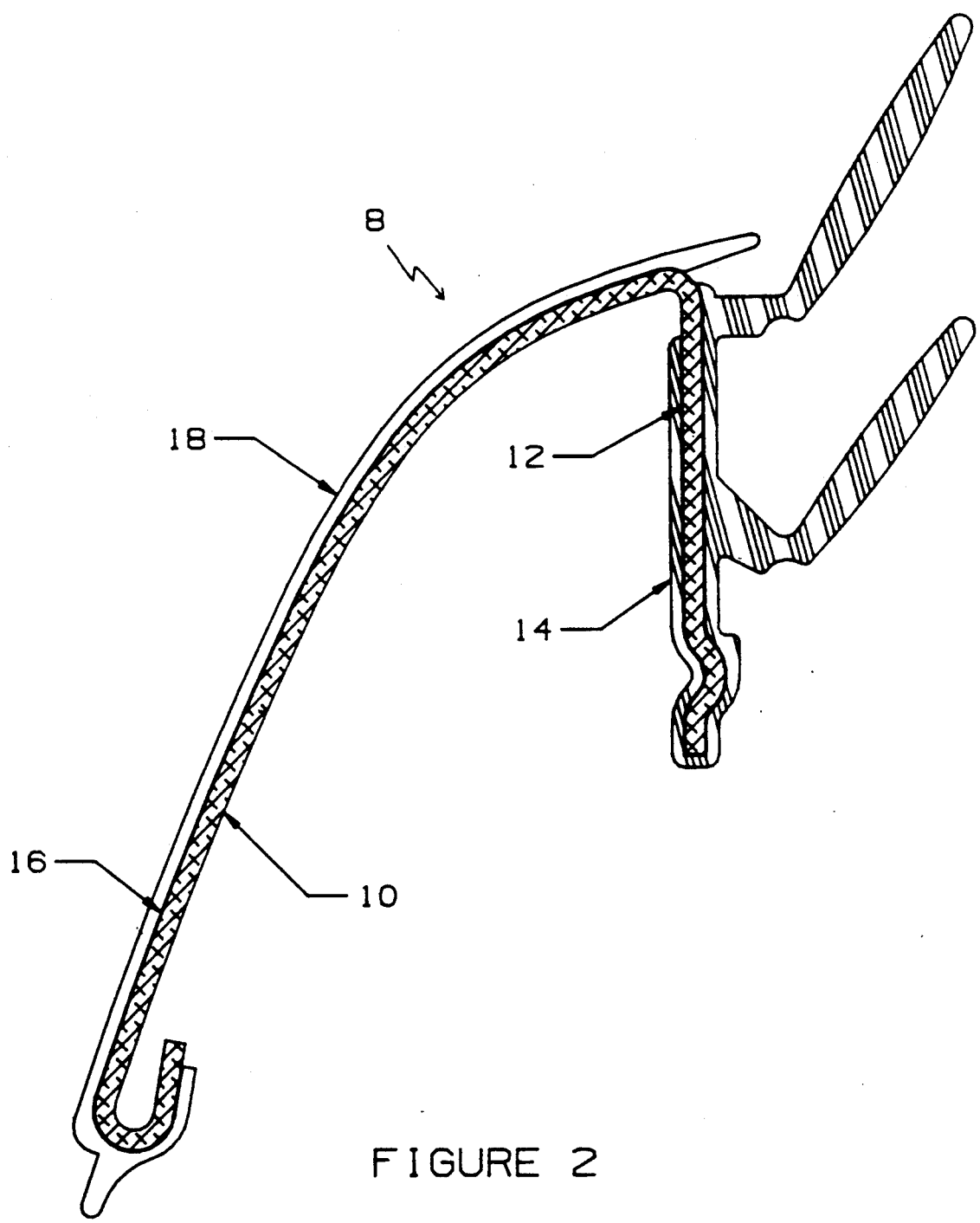
FIG. 2 is a cross-sectional view of a first embodiment product made in accordance with the Preferred process of this invention.

In this example, a bilaminate coated aluminum strip having the cross-section shown in FIG. 2 was made at a production speed of 3.5 metres/minute. To a first area of the cleaned substrate was applied an EPDM adhesive suitable for bonding EPDM to aluminum, "Chemlok 250" (trademark) a one-coat heat-activable polyisocyanate based adhesive available from the Lord Corporation. This was heated to give a surface temperature of about 120° C. the adhesive thereby being activated and ready for application of EPDM.

EPDM, available as Thona E3402D was then extruded in molten form onto the metal substrate so as to apply the EPDM to the area of the substrate covered by the adhesive.

To a second area of the substrate was applied a PVC adhesive known as A1617B, a pigmented, modified acrylic adhesive available from B.F. Goodrich, for bonding PVC to aluminum. This adhesive has the properties of bonding PVC to the aluminum substrate and being heat activated under conditions, as described below, suitable for curing the EPDM previously applied to the substrate. An alternative adhesive is Sternson Adhesives PR1029 which is also a heat-activable adhesive, although the activation temperature is a few degrees higher than the adhesive used in this example.

The partially manufactured piece was then passed through an oven at 210° C. to provide a residence time of about 6 minutes wherein the EPDM was cured and the PVC adhesive was activated.

Upon exit from the oven, PVC was extruded in molten form onto the substrate so as to apply the PVC to the area of the substrate to which the PVC adhesive was applied.

The application of flock, which is Preferred for the product of this invention as it would be used in conjunction with automobile windows and frames, was achieved as follows. Flock adhesive known as "Flocklok 852" (trademark) with catalyst "Chemglaze 9988" (trademark) was applied to the desired region of, in this instance, EPDM. The flock was applied by methods known to those skilled in the art, and the flock adhesive was cured at about 190° C., this taking about four minutes.

Figure 3:
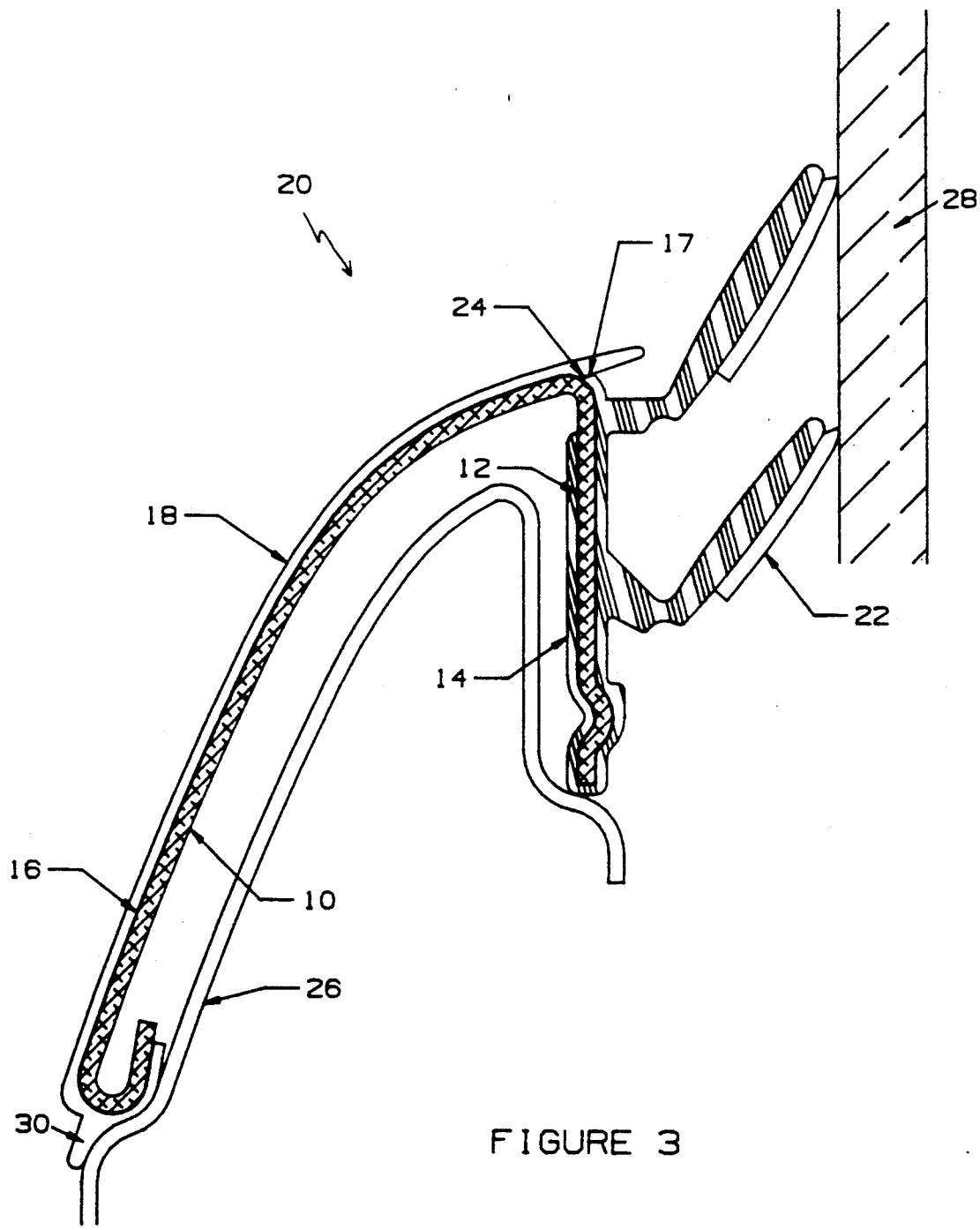
FIG. 3 is a cross-sectional view of a second Product made in accordance with the process of this invention on an automobile.
Figure 4:
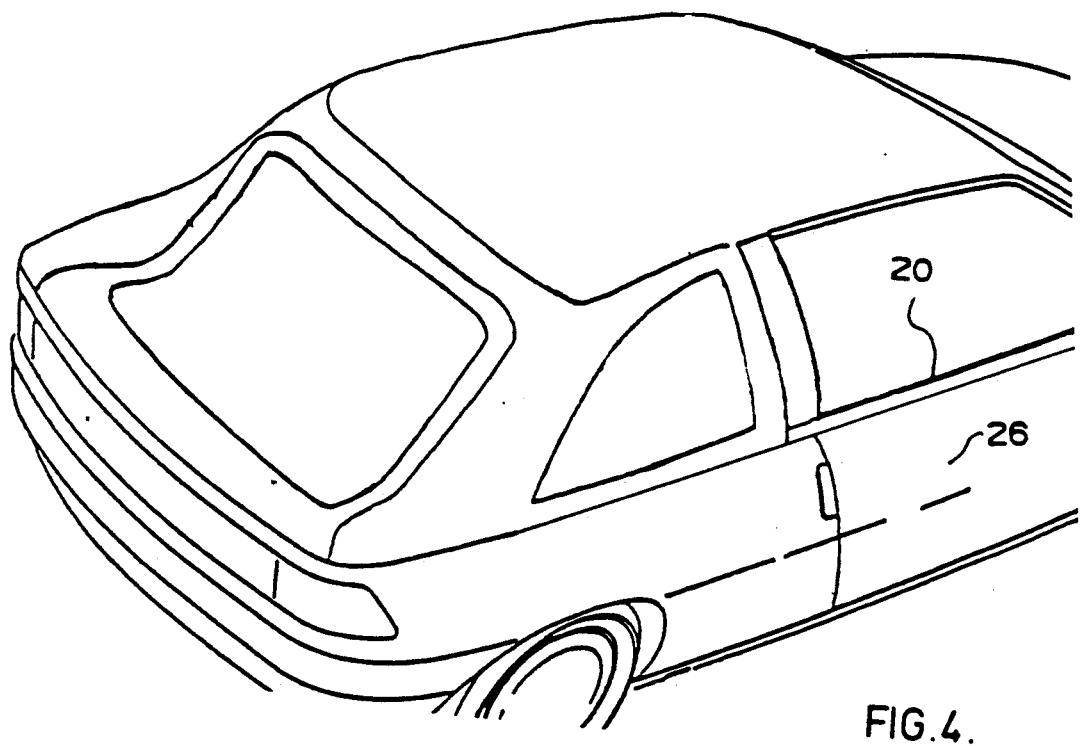
FIG. 4 is a perspective view showing the location of the second embodiment on an automobile.

The above process may be modified slightly to obtain the coated aluminum strip having the cross-section shown in FIG. 3. The modification involves application of the PVC adhesive to the second area of the substrate, and a third adhesive, Chemlok 250, to the neighboring edge portion of the EPDM to which subsequently extruded PVC is to be chemically bonded. The conditions described above for curing the EPDM and activating the PVC adhesive are suitable for activating the EPDM adhesive, Chemlok 250.

The foregoing example is of the preferred embodiment process known to the inventors at this time. As an industrial manufacturing process, at least the steps from (and including) the application of the first adhesive to PVC extrusion onto the substrate should be run on a continuous basis to provide a relatively economical process. Further, cutting of the coated substrate is Preferably done after both polymer layers have been applied to the substrate and cutting of the product having flock should be done after application of the flock. Cutting of a substrate before both coats have been applied would not be generally suitable, the subsequent extrusion of a second coat onto several shorter workpieces being relatively disadvantageous to the extrusion of the second coat onto one long workpiece. That is, cutting is generally the last step of processes according to this invention, a bilaminate coated metal substrate being cut into suitable unit lengths for shipment to, for instance, an automobile manufacturer. It will also be appreciated that while it is preferable to apply the PVC adhesive to the substrate after the application of the EPDM and to heat the PVC adhesive and EPDM in the same step to simultaneously activate the PVC adhesive and cur the EPDM, followed by application of the PVC, it is possible to heat and cure the EPDM prior to application of the PVC adhesive and to apply and activate the PVC adhesive in an additional heating step prior to the application of PVC. The resultant product would be of the same quality, but the process involves more steps and is therefore less advantageous.

The EPDM must be cured before extrusion of PVC onto the substrate since the conditions necessary for curing the EPDM are too harsh for the PVC and would damage the PVC, as for example, by causing the PVC to melt slightly and lose its intended final shape.

The starting metal substrate used in the Preferred Process illustrated is an aluminum strip or ribbon. Such a substrate of stainless steel or of galvanized steel or of zinc would work equally well in the illustrated example, but cleaning should be Preceded by roughening. It would also be Possible to similarly roughen the aluminum substrate used in the above example, although a satisfactory product was Produced without the application of a roughener.

The above example of a method of producing a Product made in accordance with this invention is intended to be illustrative. It is known that shorter evaporation and curing times for adhesives and EPDM may be achieved at higher temperatures. Production rates of between 2 to 20 metres/minute could be reasonably achieved. A typical temperature for activating the EPDM adhesive is between about 110° C. and 140° C. A typical temperature for curing the EPDM is between about 200° C. and 260° C. A flock adhesive curing temperature between 150° C and 220° C may be used. In situations such as the preferred embodiment of this invention wherein flock adhesive is applied to EPDM after the metal has been coated with PVC, this curing temperature should be kept low enough so as not to melt the PVC or spoil its finish through overheating. For example, a temperature above about 220° C. with a residence time of 2 minutes would be considered excessive.

A Preferred embodiment bilaminate product 8 of the invention is illustrated in cross-section in FIG. 2. Aluminum core substrate 10 is coated with EPDM adhesive 12, EPDM 14, PVC adhesive 16 and PVC 18. This embodiment preferably has flock 22 (illustrated in FIG. 3) applied to the complete coated substrate for use, this being well known.

A second Preferred embodiment product 20 is illustrated in FIG. 3. In this embodiment, EPDM 14 and PVC 18 are chemically bonded to each other at their juncture 24, by Chemlok 250 adhesive layer 17. This embodiment is shown fitted to a car door portion 26 having retractable window 28, the Product being fastened to the door by clips, not shown, but which are well known. As illustrated, PVC 18 is largely exposed, lower lip 30 abutting directly against the door. Flock 22 abuts directly against the window 28 and EPDM 14 is largely unexposed, being located on the interior of the door.

The aluminum substrate 10 of the preferred embodiment is rollformed to the cross-section shown before the cleaning step.

The product shown in FIG. 2 made by a continuous process according to the Preferred Process of the example was tested according to Ford Motor Company specifications and test methods and was found to perform satisfactorily for use as required for exterior automotive trim Parts. For example, it met or exceeded standards of color change, chalking, crazing, discoloration, milkiness, separation and loss of embossment when subjected to the following conditions: salt spray for 240 hours; 10 24-hour cycles, each cycle consisting of 88° C. for 4 hours, 32° C. and 95% humidity for 4 hours, and −40° C. for 16 hours; and 121° C. for 30 minutes. There was no evidence of loss of adhesion of vinyl to metal after being immersed in water at 32° C. for 4 hours, being exposed to a temperature of −29° C. for 4 hours and direct steam blasts at ends of the sample.

It is to be understood that the above example of the invention is illustrative and that the scope of the invention is defined by the appended claims.

What is claimed is:

1. A process for the manufacture of a bilaminate coated metal substrate comprising:
   (a) preparing the metal substrate for application of adhesives thereto;
   (b) applying a first activable adhesive to a first area of the substrate which is to be coated by a first layer of a thermosetting polymer;
   (c) activating the adhesive to ready the substrate for application of the thermosetting polymer;
   (d) applying the thermosetting polymer to the first area to form the first layer;
   (e) heating the thermosetting polymer to cure it;
   (f) applying a second activable adhesive to a second area of the substrate which is to be coated by a second layer of a thermoplastic polymer;
   (g) activating the second adhesive; and
   (h) applying the thermoplastic polymer to the second area to form the second layer whereby a bilaminate metal substrate having the first layer chemically bonded thereto and the second layer chemically bonded to the second area of the substrate is produced.

2. The process of claim 1 wherein preparing the substrate comprises cleaning the metal substrate.

3. The process of claim 1 wherein starting substrate material comprises a ribbon of aluminum, stainless steel, zinc or galvanized steel and preparing the substrate further comprises the prior step of rollforming the starting material and cleaning the substrate comprises washing the rollformed metal in an alkaline solution and rinsing the alkaline solution therefrom.

4. The process of claim 1 wherein the first adhesive is a polyisocyanate heat activable adhesive and activating the first adhesive comprises heating the adhesive to a temperature and for a length of time sufficient to activate the adhesive.

5. The process of claim 1 wherein the second adhesive is a modified acrylic adhesive and activating the second adhesive comprises heating the adhesive for a length of time sufficient to activate the adhesive.

6. The process of claim 1 wherein the thermosetting polymer is a polymer of ethylene propylene diene monomer.

7. The process of claim 1 wherein applying the thermosetting polymer and the thermoplastic polymer comprises extruding the respective polymers.

8. A process for the manufacture of a bilaminate coated metal substrate comprising:
   (a) preparing the substrate for application of adhesives thereto;
   (b) applying a first activable adhesive to a first area of the substrate which is to be coated by a first layer of a thermosetting polymer;
   (c) activating the adhesive to ready the substrate for application of the thermosetting polymer;
   (d) applying the thermosetting polymer to the first area to form the firs layer;
   (e) applying a second heat activable adhesive to a second area of the substrate which is to be coated by a second layer of a thermoplastic polymer;
   (f) heating the substrate obtained in step (e) to cure the thermosetting polymer and to activate the second adhesive; and
   (g) applying the thermoplastic polymer to the second area whereby a bilaminate metal substrate having the first layer chemically bonded thereto and the second layer chemically bonded to the second area of the substrate is produced.

9. The process of claim 8 wherein the first adhesive is a polyisocyanate based heat-activable adhesive and the second adhesive is a modified acrylic heat-activable adhesive.

10. The process of claim 9 wherein the first adhesive is activated when exposed to a temperature from about 110° C. to about 140° C. for a sufficient length of time.

11. The process of claim 10 wherein the second adhesive is activated when exposed to a temperature from about 200° C. to about 260° C. for a sufficient length of time.

12. The process of claim 11 wherein the thermosetting polymer is a polymer of ethylene propylene diene monomer, the thermoplastic polymer is polyvinyl chloride and step (f) involves heating the substrate in a temperature range from about 200° C. to about 260° C.

13. The process of claim 12 wherein applying the thermosetting polymer and the thermoplastic polymer comprises extruding the respective polymers, the substrate comprises a ribbon of aluminum, stainless steel, galvanized steel or zinc metal for use in step (a) and steps (c) to (g) are carried out as a continuous process for each ribbon.

14. The process of claim 13 further comprising the subsequent steps of:
   (h) applying a flock adhesive to a first area of the first polymer;
   (i) curing the flock adhesive;

(j) applying flock to the first area of the first polymer to produce a bilaminate metal product; and (k) cutting the product into suitable unit lengths.

15. The process of claim 8 further comprising the sep of applying a third adhesive to a portion of the thermosetting polymer after the step of applying the thermosetting polymer and before step (f) and wherein the third adhesive is cured during step (f) and step (g) further comprises applying the thermoplastic polymer to the portion of the thermosetting polymer to which the third adhesive has been applied.

16. The process of claim 15 wherein the first adhesive and the third adhesive have the same composition.

* * * * *